May 31, 1949. F. H. CARMAN Re. 23,117

TEXTILE MACHINE UNIT FOR DRAFTING FIBERS

Original Filed Nov. 21, 1939

Inventor
Frank H. Carman
by
Walter J. Kaufman
Attorney

Reissued May 31, 1949 Re. 23,117

UNITED STATES PATENT OFFICE 23,117

TEXTILE MACHINE UNIT FOR DRAFTING FIBERS

Frank H. Carman, Washington, D. C., assignor to Armstrong Cork Company, Lancaster, Pa., a corporation of Pennsylvania Original No. 2,287,780, dated June 30, 1942, Serial No. 305,429, November 21, 1939. Application for reissue March 18, 1943, Serial No. 479,677

15 Claims. (Cl. 19—131)

Figure 1:
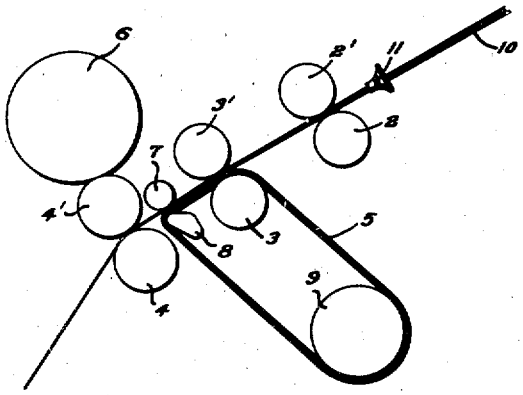

This invention relates to textile machine units for drafting fibers and is specifically described as embodied in long draft aprons, for example, long draft aprons including a base or foundation fabric having applied to the outer surface thereof a layer or film of synthetic rubber.

Long draft aprons are used in the drawing of fibers such as cotton and rayon and are commonly employed to adequately support the fibers between adjacent pairs of drafting rolls. In the so-called Casablancas system of long drafting, a pair of long draft aprons are disposed between adjacent pairs of drafting rolls so as to engage the loosely intertwined fibers passing from one pair of drafting rolls to the next forwardly disposed pair. The lower apron encircles a guide bar and is positively driven; the upper apron is disposed immediately above the lower apron and may or may not be of shorter peripheral length than the lower apron. The upper apron encircles a guide bar and an idler roll and is rotated by friction developed between the lower driven apron and the fiber being operated upon and between the contacting surfaces of the apron. Suitable guiding mechanism is provided to properly position the forward guide bars and to align the upper and lower rolls for proper operation. The upper rolls are weighted to apply pressure to the fibers being operated upon. The aprons are used to feed the fibers from one pair of drafting rolls to the next forwardly pair of drafting rolls at a speed materially slower than the speed of revolution of the next forwardly disposed drafting rolls while adequately and substantially completely supporting the fibers so that a true drafting of the fibers is effected by the forwardly disposed drafting rolls. The aprons are of relatively short peripheral length, in the neighborhood of 3½ inches to 5 inches, and may be rotated at speeds depending upon the speed of the drafting rolls, for example, 6 to 30 revolutions per minute.

In the so-called Saco-Lowell Roth system, a similar arrangement is provided except that in place of a pair of aprons a single apron is employed which conveys and supports the fiber and a pair of upper rolls press the fibers being operated upon into engagement with the apron. In both systems, the apron is subject to extreme flexing due to its movement about the rolls and the guide bar, being flexed at a relatively sharp angle during rotation.

Heretofore, leather aprons have been used which were formed of a special grade of calf skin. Leather being a natural product is not uniform in consistency and, therefore, stretches non-uniformly regardless of the temperature or humidity conditions encountered. Even with careful selection of the skins, the so-called "grain structure" of the animal hide will have a very definite effect on the extensibility of the finished apron. Leather aprons have been found to be unsatisfactory for a number of reasons, among which may be listed the following: Leather has a tendency to crack due to the fact that it is tanned and the continual flexing under the conditions of operation inevitably results in the formation of minute cracks which militate against proper drafting and eventually results in complete destruction of the apron. Leather aprons have been found to stretch unequally due to the absorption of moisture encountered in the humid operating conditions of drafting rooms with the result that one longitudinal edge of the apron will be of greater peripheral length than the other, or both edges may be of greater length than the central portion of the apron. Such uneven structure, of course, prevents operation of the frame. Needless to say, this condition is aggravated in summer months. With leather aprons, it is necessary to provide a seam or joint where the edges of the sheet from which the apron is formed abut. This seam or joint is generally skived and secured by means of adhesive, such as glue. This results in a stiff unyielding portion where the seam occurs which has different physical characteristics than the remaining portions of the apron; there is also a tendency for the seams to open upon continued flexing over relatively small diameters which is encountered in service. In many cases, carelessness in seam formation results in unevenness at the seam.

Leather aprons are expensive and are short-lived due to the defects above discussed. Another disadvantage which is of considerable importance is the fact that leather aprons cannot be finished to a precise thickness throughout without extreme expense since leather does not lend itself to finishing by grinding or buffing. Accordingly, careful selection of the skins used for forming such aprons is required, as pointed out above, and much waste is obtained as a result. When the leather apron is cracked or checked, it tends to pick up small cotton fibers and fly which after a time become of such quantity that they may fall from the apron into the work causing uneven yarn or breakage of the fiber being drawn. The defects above discussed result in the production of a poor quality of yarn because of the uneven drawing of the fibers.

The defects of leather aprons have long been recognized in the industry but no satisfactory substitute has been proposed. It has been proposed to provide an apron formed with a surface of chloroprene synthetic rubber obtained by coating, impregnating or dipping a fabric web into a solution of such chloroprene material. This type of construction, while it overcame the problems of cracking and checking to some extent, did not in any sense satisfactorily overcome all of the problems present in the use of aprons in long draft systems. The lap-type skived seam remained and the objectionable attributes thereof were still a problem. The problem of uneven stretching or elongation was not solved by such aprons.

The chief object of the present invention is to provide a textile machine unit for drafting fibers. An object of my invention is to provide a resilient, abrasion-resistant, long draft apron having great flexibility, frictional surface characteristics required for the purpose intended, and one which will not crack or check, which can be conveniently rendered of uniform thickness by grinding or buffing, which will not stretch unevenly or to any substantial extent, and which will have a life materially longer than any long draft apron heretofore produced. A further object of my invention is to provide a long draft apron which is substantially static-free under the usual conditions of humidity customarily employed in textile mills or, stated in other words, has substantially no tendency to build up a static charge to cause adherence of the fiber under normal working conditions and possesses substantially no tendency to cause sticking of the fiber being drafted.

According to my invention, I provide as a foundation for my long draft apron a tubularly or circularly woven fabric which is substantially inextensible radially; such fabric is preferably formed of cotton, although it may be formed of silk, rayon, "nylon," or glass fiber. Two typical examples of fabric of this character which may be employed are as follows: (1) Flat width $1^{25}/_{32}$ inches, warp consisting of two No. 16 strands of cotton yarn, 177 ends, filling of the same yarn 78 picks, and weighing 7.5 pounds per gross yards; and (2) flat width 2 inches, warp consisting of four No. 20 strands of cotton yarn, 163 ends, filling of the same yarn 52 picks, and weighing 10.1 pounds per gross yards.

Such fabric foundation is impregnated with a material of a character, preferably, similar to the character of the wearing surface layer to be later applied. If a synthetic rubber composition, such as "Perbunan" or "neoprene," be used to form the surface of the apron, the fabric is impregnated by drawing the same through a bath of such composition dissolved in a suitable solvent, such as carbon tetrachloride. This thoroughly impregnates the fabric and aids in the adhesion of the surface layer thereto in addition to any mechanical bond which is obtained. The fabric may be dried, for example, by evaporation of the solvent of the impregnating composition, and is then drawn over a mandrel of about the same outside diameter as the inside diameter of the tubular fabric foundation. The fabric is stretched by application of tension to the opposite ends thereof as disposed over the mandrel so as to eliminate all wrinkles and apply a limited amount of tension to the warp and filler threads. It will be appreciated the fabric is stretched to the limits of its extensibility radially although at this period it is still slightly extensible longitudinally. If desired, the inner surface of the tubular fabric may be coated with a thin layer or coating of a composition which may be similar to the impregnating composition. This coating adds strength to the finished product and resists wear caused by the movement of the apron over the flutings of the roll.

The next step is to prepare a suitable outer wearing surface which may be formed of synthetic rubber composition. For example, I may use a "Perbunan" composition of the following formula:

| | Parts by weight |
|---|---|
| "Perbunan" | 100 |
| Pine tar | 10 |
| Rosin | 6 |
| Carbon black | 25 |
| Zinc oxide | 5 |
| Stearic acid | .75 |
| Paraffin | .5 |
| Sulphur | 1.5 |
| Altax | 1.5 |
| D.P.G. | .2 |
| Tricresyl phosphate | 6 |
| Whiting | 28.5 |

This mixture is suitably milled. Thereafter, it is fed to an extrusion machine of the screw type well known to those in the art and a hollow body of approximately $1^1/_8$ inches inside diameter with a wall thickness of $\frac{3}{32}$ inch is produced which is adapted to serve as the wearing surface of my long draft apron. The extruded wearing surface is permitted to cool and is then inflated and applied over the tubular fabric foundation, which was previously applied to the mandrel being drawn down thereover. This combination of fabric and wearing surface layer is then wrapped with wet fabric tape in order to obtain proper engagement of the wearing surface with the impregnated fabric. It is then vulcanized by placing the article in an open steam vulcanizer and applying steam for a period sufficient to cure the mass, for example, 30 minutes at 300° F. will be satisfactory for vulcanizing or curing the body above recited. The sulfur, of course, serves as a vulcanizing agent as is well-known in the art. The partially completed article is then removed from the mandrel and mounted on a suitable mandrel for grinding or buffing the outer surface to a finally determined diameter. The material is then cut to the desired length for use as long draft aprons, the finished product being substantially inextensible longitudinally as well as radially. The wearing surface so formed has a hardness of about 58 as measured on the Shore type "A" durometer.

In place of the "Perbunan" composition above recited, I may use a "neoprene" composition of the following formula:

| | Parts by weight |
|---|---|
| "Neoprene" | 100 |
| Rosin | 5 |
| Light calcined magnesium oxide | 10 |
| Zinc oxide | 20 |
| Cottonseed oil | 3 |
| Antioxidant | 2 |
| Stearic acid | 1 |
| Fine carbon black | 15 |
| Factice | 5 |

The "neoprene" composition may be formed in tubular wearing surface layers for application to a tubular fabric foundation in the same manner as above recited with regards to the "Perbunan" composition.

"Perbunan" is a synthetic rubber of the type known as a polymerized butadiene acrylic nitrile copolymer while "neoprene" is a synthetic rubber of the type known as polymerized chloroprene. Other materials known generally as synthetic rubbers may be employed, such, for example, as "Thiokol" (olefin polysulfide), "Koroseal" (plasticized polyvinyl chloride) or similar copolymers containing a high content of chloride such as polyvinyl chloride-acetate copolymers, or the like. Any of the materials of this character which possess high resistance to oil, extreme flexibility and the characteristics of being extremely resistant to cracking upon continued flexing over long periods of time may be substituted. Under the usual conditions of humidity customarily employed in textile mills, the textile units described above are substantially static-free. Rubber, of course, may be used in some instances where the service does not require a high degree of oil resistance. The method employed in forming my aprons may be varied depending upon the type of synthetic rubber used; for example, "Koroseal" does not require vulcanization and aprons having wearing surfaces of such material need not be vulcanized.

In the above described composition, pine tar and rosin are used as softeners; in their place, I may use coal tar, cumar resin, or the like. Carbon black is used as a reinforcer. If desired, I may use barytes, clay, or zinc oxide in its place. Zinc oxide is used as an activator for the accelerators, Altax and D. P. G. Other accelerators, such as tuads or Captax, may likewise be used if desired. Sulfur, of course, in the "Perbunan" composition is used as a vulcanizing agent; in the "neoprene" composition, sulfur is not essential for the zinc oxide used therein aids in vulcanization. Tricresyl phosphate is used as a plasticizer and in its place I may use dibutyl phthalate or dibenzyl ether. Whiting is used as a filler and any of the ordinary fillers well-known in the art, such as barytes or clay may be used in its place. Stearic acid is used as a plasticizer and likewise assists in vulcanization. Preferably, as an anti-oxidant, I use the compound known commercially as "Neozone" D, although any of the well-known commercial anti-oxidants may be used. Magnesium oxide is used as a stabilizer. Factice is used as a softener or plasticizer; and in its place, I may use mineral oils or petrolatum. Paraffin and cottonseed oil also serve as plasticizers in the above described compositions. It will be understood the ingredients and the amounts thereof used in the above composition may be varied as desired depending upon the properties required in the completed apron.

Figure 2:
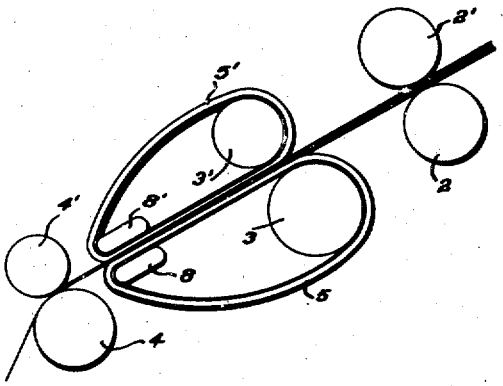
Figure 3:
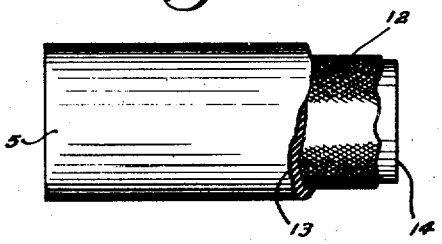

The attached drawing illustrates a preferred embodiment of my invention, in which Figure 1 is a diagrammatic view of the Saco-Lowell Roth system of long drafting including a long draft apron of my invention;

Figure 2 is a diagrammatic view of the Casablancas system of long drafting including my long draft aprons; and, Figure 3 is an elevation of my long draft apron, partially broken away to disclose the tubularly woven fabric foundation.

Referring to the drawing, there is illustrated diagrammatically in Figure 1, the so-called Saco-Lowell Roth system of long drafting including the apron of my invention. The system comprises a plurality of positively driven bottom rolls 2, 3, and 4 and a plurality of top rolls 2', 3', and 4' which are rotated by frictional contact with the bottom rolls 2 and 4 and the apron 5. The upper or top rolls are weighted by any desired means to apply pressure to the fibers being operated upon. The roll 4' in some cases picks up fibers and in order to remove such fibers there is provided a clearer roll 6 which may be covered with felt or like material. Preferably, a slip roll 7 is provided, placed between the rolls 3' and 4'. The apron 5 passes around a guide bar 8 and an idler roll 9 and is positively driven by the bottom roll 3. Fibers 10 are fed from a guide 11 to rolls 2 and 2', and thence to roll 3' and the apron 5 which carries the fibers under the slip roll 7 and as close as possible to the bite of the rolls 4 and 4'. There is generally a short draft between the rolls 2, 2', and the rolls 3, 3' while the rolls 4, 4' are usually rotated with a surface speed from 6 to 30 times that of the rolls 2, 2'. The apron 5, shown enlarged in Figure 3, comprises an impregnated, tubularly woven fabric foundation 12 carrying a layer 13 of synthetic rubber which serves as the wearing surface of the apron. If desired, a thin layer or coating 14 may be applied to the inner surface of the fabric foundation 12 to resist wear caused by movement of the apron over the flutings of the rolls 3 and 9. Such apron is substantially static-free under the conditions of humidity customarily employed in textile mills.

In Figure 2, I have illustrated diagrammatically the so-called Casablancas system of long drafting. The Casablancas system likewise comprises a series of positively driven bottom rolls 2, 3, and 4 and a plurality of top rolls 2', 3' and 4' which are not positively driven but are rotated by frictional contact with the bottom rolls 2 and 4. The top rolls are, of course weighted to apply pressure to the fibers. Aprons 5 and 5' are provided, the apron 5 extending around the bottom roll 3 and the guide bar 8 and is positively driven while the apron 5' encircles an idler roll 3' and a guide bar 8' and is rotated by friction developed between the lower driven apron 5 and the fibers being operated upon and between the contacting surfaces of the aprons 5 and 5'. In this system, there is generally a short draft between the rolls 2, 2', and the rolls 3, 3' while the rolls 4, 4' are usually rotated with a surface speed 6 to 30 times that of the rolls 2, 2'. The aprons 5 and 5' are formed as above described.

The product produced by my invention comprises a seamless tubular fabric in slightly extended condition in which the interstices between the fibers constituting the body are filled or substantially filled with the composition impregnating the body and the coating material or wearing surface which is pressed thereinto and cured in situ therein. The outer wearing surface is seamless and is tough, flexible, oil resistant, and may be ground to a smooth, true surface of uniform dimensions, thereby producing an apron having uniform wall thickness throughout. The foundation is substantially inextensible radially, and, after vulcanizing or curing the apron, it is likewise substantially inextensible longitudinally so that the apron cannot stretch and thus possess a life materially longer than any long draft apron heretofore produced.

While I have described and illustrated a preferred embodiment of my invention, it will be understood my invention is not so limited, since it may be otherwise embodied within the scope of the following claims.

I claim:

1. A long draft apron for use in fiber drawing comprising a seamless, tubularly woven fabric foundation in substantially completely, radially extended condition, an impregnating composition substantially filling the interstices of said fabric, and a seamless, oil resistant, flexible wearing surface integrally united with said foundation, said wearing surface being vulcanized in situ on said foundation.

2. A long draft apron for use in fiber drawing comprising a seamless, tubularly woven fabric foundation which is substantially inextensible radially, said foundation being impregnated with a synthetic rubber composition, and a seamless, oil resistant, flexible wearing surface of synthetic rubber composition integrally united with said foundation.

3. A long draft apron for use in fiber drawing comprising a seamless, tubularly woven fabric foundation in slightly extended condition, said foundation being further substantially inextensible radially, an impregnating composition substantially filling the interstices of said fabric, and a seamless, oil resistant, flexible wearing surface of synthetic rubber composition, said impregnating composition being of similar composition to said wearing surface, said impregnating composition and said wearing surface being vulcanized in situ on said foundation whereby the foundation and the wearing surface are integrally united.

4. A long draft apron for use in fiber drawing comprising a seamless, tubularly woven fabric foundation in substantially completely, radially extended condition, an impregnating composition substantially filling the interstices of said fabric, and a seamless, oil resistant flexible wearing surface having as an essential ingredient a synthetic rubber chosen from a class consisting of a polymerized butadiene acrylic nitrile copolymer, a plasticized polyvinyl chloride, a plasticized polyvinyl chloride-acetate copolymer, an olefin polysulfide, and a polymerized chloroprene.

5. A long draft apron for use in fiber drawing comprising a seamless, tubularly woven fabric foundation which is substantially inextensible radially, a wear resistant coating on the interior of said tubular fabric, and a seamless flexible, oil resistant wearing surface layer of synthetic rubber composition on the exterior of said foundation.

6. A long draft apron for use in fiber drawing comprising a seamless, woven fabric tube in substantially completely, radially extended condition and which is further inextensible radially, and a seamless, oil resistant, flexible wearing surface integrally united to said tube, said surface having as an essential ingredient a base of synthetic rubber chosen from a class consisting of a polymerized butadiene acrylic nitrile copolymer, a plasticized polyvinyl chloride, a plasticized polyvinyl chloride-acetate copolymer, an olefin polysulfide, and a polymerized chloroprene.

7. A long draft apron for use in fiber drawing comprising a seamless, woven fabric tube in substantially completely, radially extended condition and which is further inextensible radially, a seamless, oil resistant, flexible wearing surface integrally united to said tube, said surface having as an essential ingredient a base of synthetic rubber chosen from a class consisting of a polymerized butadiene acrylic nitrile copolymer, a plasticized polyvinyl chloride, a plasticized chloride-acetate copolymer, an olefin polysulfide, and a polymerized chloroprene, and a wear resistant coating integrally united to the interior of said tube, said coating containing as an essential ingredient a base of synthetic rubber chosen from a class consisting of a polymerized butadiene acrylic nitrile copolymer, a plasticized polyvinyl chloride, a plasticized chloride-acetate copolymer, an olefin polysulfide, and a polymerized chloroprene.

8. A textile machine unit for drafting fibers having a fiber contacting surface layer consisting of a vulcanized resilient composition including a vulcanizing agent such as sulphur comprising as an essential constituent a synthetic rubber composed of acrylic nitrile and butadiene copolymer.

9. A textile machine unit for drafting fibers having a fiber contacting surface layer for contacting fibers consisting of a resilient composition including a vulcanizing agent such as sulphur comprising as an essential constituent a vulcanized synthetic rubber composed of butadiene-acrylic nitrile copolymer admixed with filler.

10. A textile machine unit for drafting fibers having a fiber contacting surface layer for contacting fibers consisting of a resilient composition comprising as an essential constituent a synthetic rubber composed of butadiene-acrylic nitrile copolymer which is compounded with filler and resinous ingredients and vulcanized to form a surface layer which is resistant to abrasion and having substantially no tendency to cause sticking of the fiber to the same.

11. A textile machine unit for drafting fibers having a fiber engaging member vulcanized with a vulcanizing agent and formed of a composition which has been polymerized containing butadiene-acrylic nitrile copolymer as an essential constituent, with whiting and coumarone resin incorporated in sufficient amounts to give a substantially static-free friction resistant wearing surface.

12. A textile machine unit for drafting fibers having a fiber contacting element comprising a synthetic rubber composition composed of butadiene-acrylic nitrile copolymer, filler, resin and sulfur, which has been vulcanized with a vulcanizing agent such as sulphur to produce a product having an oil resistant, substantially static-free fiber working surface.

13. A textile machine fiber contacting element comprising butadiene-acrylic nitrile copolymer compounded with substances serving to provide the required hardness and wearing qualities which has been vulcanized with sulphur, said fiber working element being substantially static-free under ordinary working conditions.

14. A textile machine fiber contacting element provided with a surface layer formed of an elastic composition comprising as a principal ingredient synthetic rubber selected from the group consisting of the copolymers of butadiene-acrylic acid esters and acrylic nitrile, said synthetic rubber being compounded with addition agents and vulcanized with sulphur to provide a relatively hard, resilient body of uniform density and having substantially no tendency to build up a static charge to cause adherence of the fiber under normal working conditions.

15. A long draft apron for drafting fibers having a fiber contacting surface layer consisting of a vulcanized resilient composition comprising as an essential constituent a synthetic rubber composed of acrylic nitrile and butadiene copolymer.

FRANK H. CARMAN.

No references cited.